Dec. 28, 1943.  W. C. DITTMAR  2,337,742
METHOD OF MOUNTING CONNECTION DEVICES
Filed Dec. 26, 1940  3 Sheets-Sheet 1

INVENTOR
WILLIAM C. DITTMAR
BY
Beau, Brooks, Buckley & Beau
ATTORNEYS

Dec. 28, 1943.   W. C. DITTMAR   2,337,742
METHOD OF MOUNTING CONNECTION DEVICES
Filed Dec. 26, 1940   3 Sheets-Sheet 2

INVENTOR
WILLIAM C. DITTMAR
BY
Bean, Brooks, Buckley & Bean.
ATTORNEYS

Dec. 28, 1943.   W. C. DITTMAR   2,337,742
METHOD OF MOUNTING CONNECTION DEVICES
Filed Dec. 26, 1940   3 Sheets-Sheet 3

INVENTOR
WILLIAM C. DITTMAR
BY
Bean, Brooks, Buckley & Bean
ATTORNEYS

Patented Dec. 28, 1943

2,337,742

UNITED STATES PATENT OFFICE 2,337,742

METHOD OF MOUNTING CONNECTION DEVICES

William C. Dittmar, Buffalo, N. Y., assignor to Bell Aircraft Corporation, Buffalo, N. Y.

Application December 26, 1940, Serial No. 371,682

2 Claims. (Cl. 29—148.2)

This invention relates to methods of mounting quick detachable connection devices upon sheet metal structural elements, or the like. More particularly the invention relates to improved method of mounting connector devices of the kind known in the trade as "Camloc" fasteners upon relatively thin sheet metal structural elements as in connection with the manufacture of airplanes, and the like.

Fastening devices of the type referred to provide effective means for detachably connecting cover plates and cowling parts and the like to fixed structural elements of airplanes, for example, whereby ready access may be had to the interior thereof at points requiring servicing operations. Such connectors are designed so as to be mounted upon supporting elements by means of processes resembling riveting operations whereby flange portions of the connector devices are deformed so as to lock the latter upon the supporting elements. In connection with airplane manufacture, however, when the connector devices are arranged to be mounted upon relatively thin sheet metal members of soft aluminum alloy metal or the like which form the outer "skin" of the airplane structure the process of riveting or beading over the mounting flange portions of the connectors upon the soft skin sheet metal involves certain difficulties which are not ordinarily met in connection with the mounting of such devices upon heavier structural elements.

For example, it has been found that prior art methods of backing up the work and performing riveting processes are incapable of providing suitable results in connection with the mounting of the connector devices referred to upon relatively soft and thin sheet metal parts as in connection with airplane manufacture for the purpose described hereinabove. The use of such prior art methods results in mounting connections of non-uniform and improperly aligned character, and the mounting sheet metal parts usually become buckled or otherwise distorted as a result of forces applied thereto during the mounting processes. It is the primary object of the present invention to avoid the difficulties and disadvantages of the prior art as explained hereinabove. Another object of the invention is to provide an improved method of mounting detachable connector devices of the character described upon sheet metal parts. Other objects and advantages of the invention will appear in the specification hereinafter.

Figure 7:
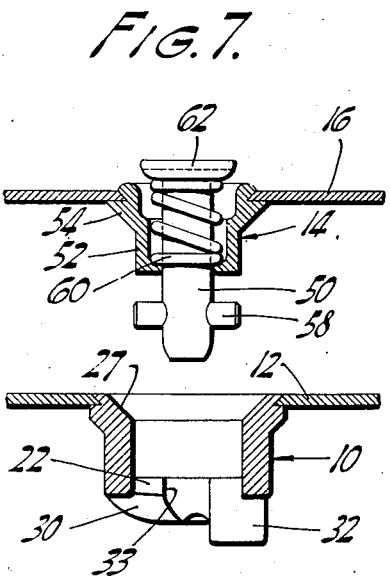
Fig. 7 is a vertical section through a paired set of connector elements of the "Camloc" type in disassembled relation.
Figure 8:
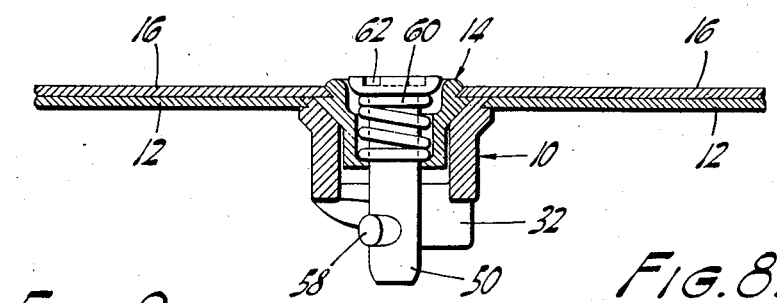
Fig. 8 is a section of the "Camloc" unit of Fig. 7 with the elements thereof arranged in connected relation.
Figure 9:
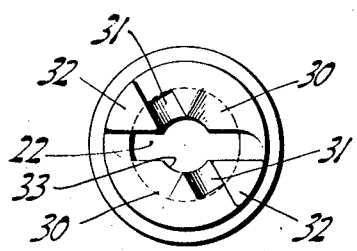
Fig. 9 is a bottom plan of the connector device of Figs. 2 and 3.

The invention is illustrated in conjunction with the fastening of detachable connectors of the type known in the trade as "Camloc" fasteners upon relatively thin sheet metal parts; and it will be noted that each fastener unit of the type referred to comprises a pair of coacting connector devices as illustrated by Fig. 7; the members of which will be referred to hereinafter as "collar" and "stud" elements and which are shown separately mounted upon opposed sheet metal structures so as to come into registry for fastening purposes, as illustrated by Fig. 8.

Figure 1:
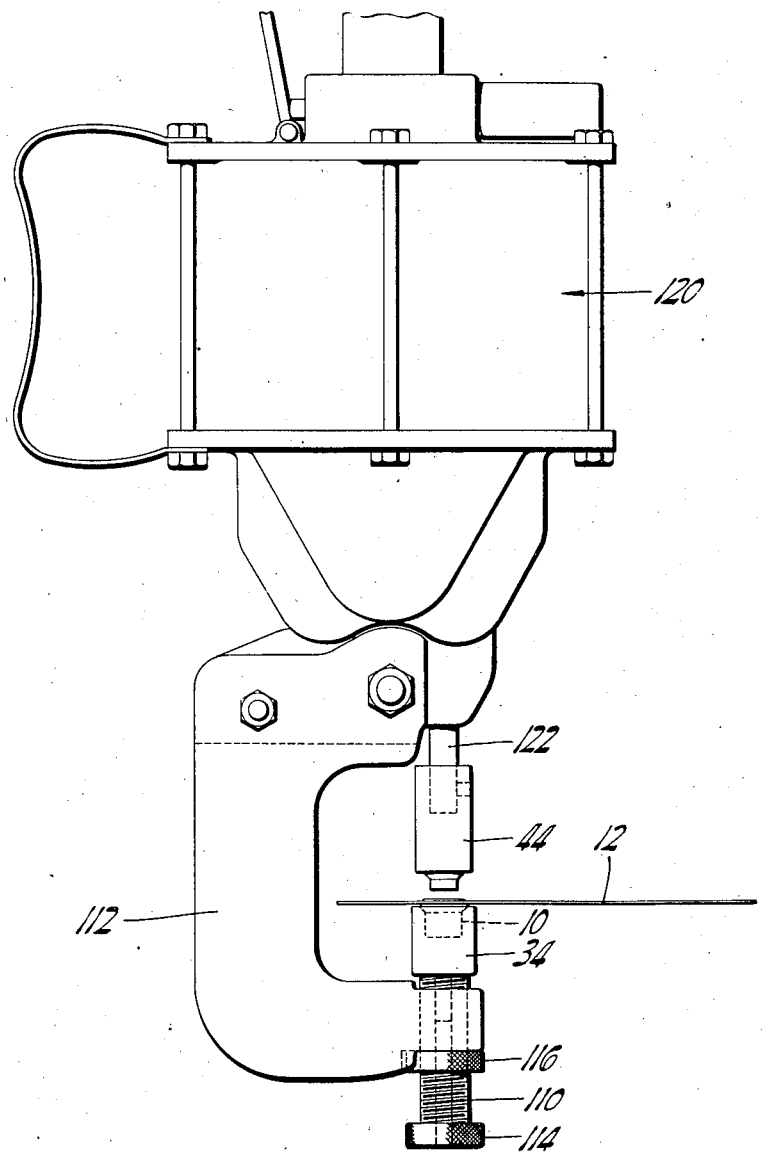
Fig. 1 is an elevation of a tool of the invention having a connector device and a sheet metal part arranged in association therewith in preparation for fixing of the connector device to the sheet metal element in accord with the invention.
Figure 2:
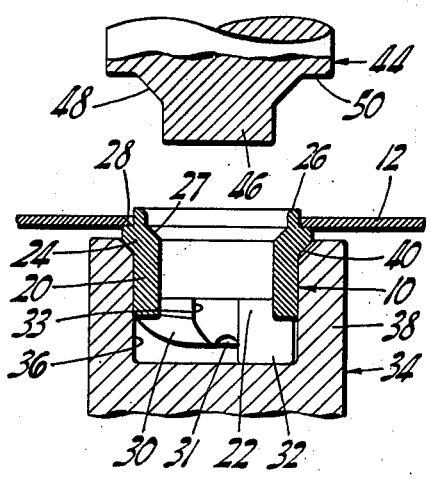
Fig. 2 is a fragmentary vertical section, on an enlarged scale, through opposed punch and die portions of the tool of the invention with a connector device mounted thereon in association with a sheet metal part prior to operation of the tool to fix the connector to the sheet metal part.
Figure 3:
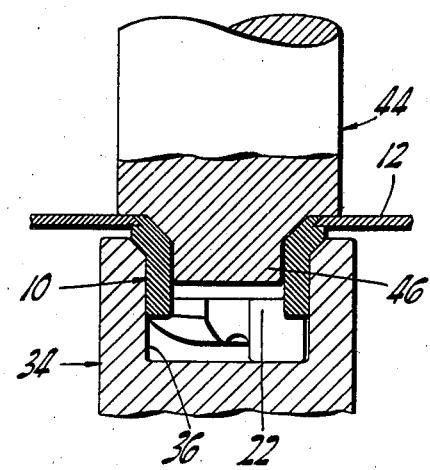
Fig. 3 is a view corresponding to Fig. 2 showing the relative positions of the elements thereof at the end of the fixing operation of the tool.
Figure 4:
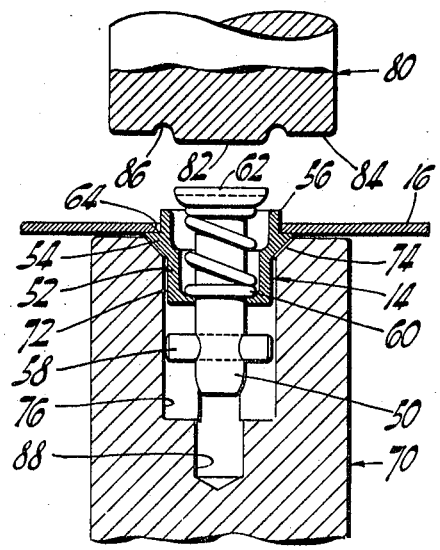
Fig. 4 is a view similar to Fig. 2 showing another form of tool plunger and die set and another form of connector device arranged in association with a sheet metal part preparatory to operation of the tool.
Figure 5:
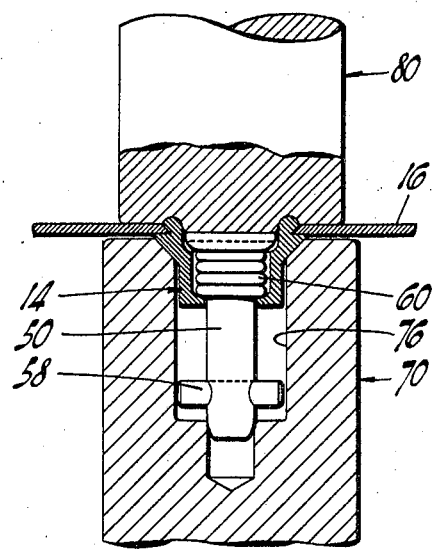
Fig. 5 is a view corresponding to Fig. 4 showing the relative positions of the elements thereof at the end of the operating stroke of the tool.

Figs. 1, 2 and 3 illustrate the process of mounting a collar element 10 of a "Camloc" unit upon a sheet metal member 12 which may constitute a fixed skin portion of an airplane fuselage or wing structure, or the like. Figs. 4 and 5 illustrate the process of mounting a corresponding stud element 14 of the same "Camloc" unit upon a sheet metal element 16 which may constitute, for example, a cover plate which is adapted to function as a closure for an opening through the skin structure of which the sheet metal element 12 is a part.

As shown in Fig. 2, the collar element 10 of the "Camloc" unit comprises a generally cup-shaped body member 20 which is transversely slotted as at 22 through the bottom well thereof to permit insertion therethrough of the locking pin of the corresponding stud element 14 of the unit, as will be explained hereinafter. The body member 20 is formed with an annular shoulder 24 extending laterally therearound for engagement beneath the mounting sheet metal member 12 in abutting relation thereagainst. The collar is also formed with a flange portion 26 extending above an outwardly sloping portion 27; the flange 26 being adapted to extend through a countersunk opening 28 provided in the sheet metal element 12 preparatory to the mounting process. The flange portion 26 is formed of malleable metal or the like so as to be adapted to be pressed radially outwardly and down against the adjacent edge portion of the sheet metal part 12 in such manner as to overhang the latter and to cooperate with the shoulder 24 to firmly fix the connector 10 upon the sheet metal part 12. The upper surface portion of the shoulder 24 is preferably provided of serrated or otherwise roughened form so as to be adapted to be firmly keyed into the under surface of the sheet metal part 12 upon locking of the deformable flange 26 thereupon. Thus, means are provided for preventing the connector 10 from rotating within the opening in the sheet metal member 12. The exterior of the bottom of the collar member 10 is provided with a pair of oppositely sloping cam faces 30 at opposite sides of the slot 22 which lead into recesses 31 adjacent stop abutments 32 for detachable locking engagement with the locking pin element of the corresponding stud member 14 of the Camloc unit. The collar 10 is also bored at 33 to receive the locking shaft of the corresponding stud element of the Camloc unit as will be explained hereinafter.

In practicing the methods of the prior art and in using the tools of the prior art for the purpose of accomplishing locking of the deformable flange 26 upon supporting members corresponding to the sheet member 12, as explained hereinabove, the mounting sheet members have invariably been subjected to buckling and other distorting stresses; and the beading of the flange portion 26 over the adjacent marginal edge of the mounting sheet has heretofore been inaccurately and non-uniformly accomplished in such manner as to provide insecure connections between the elements 10 and 12. Also, as a result of employment of the mounting tools and methods of the prior art the deformable flange portion 26 has invariably become distorted in undesirable manner, such as inwardly toward the center of the collar socket to such degree as to cause subsequent interference with insertion of the stud element 14 of the Camloc unit for detachable connection purposes in accord with the purpose of the connection device.

In accord with the present invention I provide an improved tool means for mounting the collar element 10 of the Camloc unit upon the mounting sheet 12 whereby the collar unit is supported in an improved manner during the mounting process, and whereby the process of pressing the deformable flange portion 26 into locking engagement with respect to the mounting sheet 12 is performed in an improved manner. For this purpose I provide, as illustrated by Figs. 2 and 3, a supporting die or socket 34 of hardened steel or the like which is bored as at 36 to receive the majority of the body portion of the Camloc collar member 10 in socketed relation therein. The pair of opposed abutments 32 are flat-surfaced at their lower portions and thus provide a pair of supporting abutments upon which the Camloc collar member 10 is adapted to rest against the bottom of the bored portion of the socket member 34 as illustrated in Fig. 2. The annular side wall 38 of the socket member 34 is formed to extend about the body of the Camloc collar member 10 and to terminate at a sloping wall portion 40 disposed about 7/1000 of an inch short of the adjacent surface of the shoulder 24 of the collar member. It will be noted that the lower face of the shoulder 24 is sloped, and that the adjacent face 40 of the socket 34 is similarly sloped in complementary fashion. Thus, the collar 10 is adapted to be set within the socket 34 and to rest against the bottom thereof and to be thereby supported so that the upper end portion of the collar 10 is free to float laterally because of the clearance provided between the shoulder 24 and the socket face 40.

A punch 44 is provided so as to have a central extending boss portion 46 adapted to be inserted within the central bore of the Camloc collar 10 in free fitting relation therein, and the boss 46 leads upwardly into a conically surfaced press portion 48 which is adapted to interfit with the sloping surface 27 of the collar 10 and to simultaneously press the deformable flange 26 thereof outwardly against the mounting sheet 12. The press portion 48 subjoins a flat annular anvil portion 50 of the plunger which is adapted to match the upper surface of the sheet 12 subsequent to deformation of the flange 26, as illustrated by Fig. 3. Thus, it will be noted that during movement of the plunger 44 into the position illustrated by Fig. 3 the Camloc collar 10 and the sheet member 12 are firmly supported by the socket member 34 and the boss 46 of the plunger prevents the collar from being deformed inwardly while the press portion 48 cooperates with the anvil portion 50 to force the material of the flange 26 into the final position shown while the shoulder portion 24 of the Camloc collar is permitted to expand into the gap between the socket surface 40 and the shoulder 24 into further sheet gripping position. Preferably, the collar receiving opening in the sheet member 12 will be countersunk and of dimensions as shown so as to freely allow a slight expansion of the collar member therein in connection with the flange deforming process without subjecting the sheet member 12 to stretching forces in the region of the opening such as would otherwise buckle and distort the sheet member. Consequently, a firm locking of the Camloc element 10 upon the sheet member 12 is provided without harmful distortion of subsequently interfitting portions of the Camloc element in such manner as would otherwise interfere with the smooth operation of the Camloc unit, and a perfectly flush top surface is provided at the juncture of the upper face of the sheet 12 and the collar 10 so that the connecting sheet element 16 may be applied closely thereagainst, as will be explained hereinafter.

Figs. 4 and 5 illustrate the method and means of the invention for mounting the stud element 14 of the Camloc unit upon the sheet member 16. It will be noted that the stud element 14 comprises generally a shaft 50 which is rotatably carried within a cup-shaped annulus 52 which is formed with an annular shoulder 54 and an upstanding flange 56 which resemble somewhat the shoulder 24 and the flange 26 of the corresponding Camloc collar member 10. The shaft 50 carries a diametrically extending pin 58 for locking engagement with the recessed portions 31 of the corresponding collar member when the shaft 50 is inserted through the central bore 33 of the collar member and rotated so that the pin 58 moves against the camming surfaces 30 of the collar member. A compression spring 60 is seated beneath the head 62 of the shaft 50 to cause the pin 58 to be detachably retained in locking engagement with the recessed portions 31 of the collar.

To mount the stud element 14 upon the sheet 16 the sheet is provided with a countersunk opening at 64 so as to permit the extending flange portion 56 to be inserted therethrough into the position illustrated by Fig. 4 wherein the shoulder 54 rests against the under surface of the sheet 16. A supporting die or socket 70 is provided with a central bore 72 so as to be adapted to receive the stud element 14 in free fitting relation therein, and the upper end portion of the socket wall is tapered as at 74 so as to complement the form of the adjacent surface portion of the shoulder 54 of the annulus 52. However, the stud element is arranged to be supported upon the socket member 70 by bearing at its bottom against the bottom of the bore 72, and the elements are so dimensioned that a clearance of about 7/1000 of an inch is provided between the socket surface 74 and the shoulder 54. Hence, the annulus 52 is thereby supported in free-centering relation within the socket device 70. As illustrated in Fig. 4, the shaft 50 is normally disposed under the action of the spring 60 so as to extend at its headed end 62 above the level of the flange 56 of the annulus. The socket 70 is transversely slotted at 76 to accommodate the pin 58 in free-fitting relation therein.

A punch 80 is provided with a central extending boss 82 at its lower face portion, and an annular anvil portion 84 of plane form is formed concentrically of the extending boss 82. The punch face is annularly grooved as at 86 between the boss 82 and the anvil 84, and the punch member 80 is arranged to be moved from a position corresponding to that illustrated by Fig. 4 into the position illustrated by Fig. 5 for the purpose of pressing the extending flange 56 of the annulus into locking engagement with respect to the sheet member 16 as illustrated by the drawing. Thus, it will be noted that the boss portion 82 is adapted to depress the shaft 50 against the action of the spring 60 as an incident to the flange deforming operation so that the boss 82 may enter the space within the annular flange 56 to prevent the material of the flange from being deformed inwardly in such manner as would otherwise cause interferences with operating movements of the shaft head 62 relative to the annulus 52. It will also be noted that the flange-deforming operation as described hereinabove will cause the flange to be pressed into the form illustrated by Fig. 5 in such manner as to coact with the shoulder 54 to provide a firm connection between the annulus 52 and the sheet member 16. The socket member 70 will be counterbored as at 88 to accommodate free movement of the shaft 50 under the action of the plunger 80 during the mounting operation, as illustrated by Fig. 5.

Thus, it will be understood that the invention provides perfect centering of the stud mounting annulus 52 upon the sheet 16, and uniform support of the annulus during the flange deforming operation, and positive guiding of the flange deforming process in such manner that the flange 56 will be uniformly pressed at all portions thereof into rigid engagement with the sheet 16 to provide a perfect mounting of the connector upon the sheet member. Consequently, the invention provides means for mounting the collar and stud elements of the Camloc unit separately upon their respective sheet metal structures in such manner that the connector devices are each firmly locked in position upon their mounting sheet members and are in condition to function perfectly in connection with detachable locking operations, as illustrated by Fig. 8, in such manner that the connector devices meet in perfect registry and alignment and the supporting sheet members 12 and 16 are locked together in perfectly flush relation and are otherwise undistorted in accord with the ideals and purposes of the fastening device.

Figure 6:
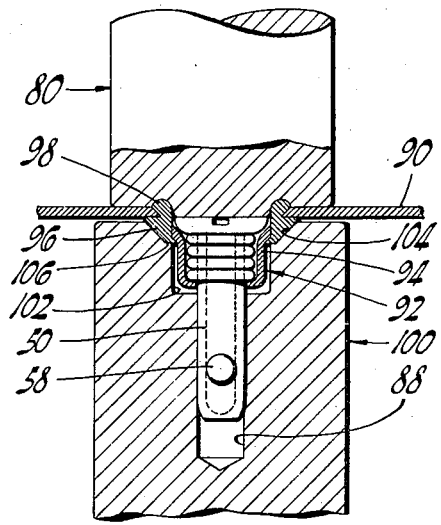
Fig. 6 is a view similar to Fig. 5 embodying a modified form of the connector device of Fig. 5.

Fig. 6 illustrates another form of Camloc stud element being mounted upon a sheet metal member 90 which corresponds to the sheet metal member 16 of Figs. 4, 5, 7 and 8. In this case the stud element designated generally by the numeral 92 comprises a two-piece body member consisting of a cup-shaped element 94 and a supporting ring member 96 which functionally combine when in finally mounted relation upon the sheet 90 to correspond to the annulus member 52 of Figs. 4, 5, 7 and 8. The ring member 96 is formed with an upstanding flange portion, as in the case of the annulus 52, to provide material for pressing over as at 98 into locking engagement upon the supporting sheet 90 upon operation of the die 80 as explained hereinabove in connection with the mounting of the device of Figs. 4 and 5. The ring 96 supports the cup 94 in free sliding relation therein, and the locking shaft 50 is held against complete disengagement from the cup 94 by the locking pin 58 after the connector device is assembled in the form shown by Fig. 6. Consequently, the ring 96 which carries the deformable flange material is not adapted to be supported from below for the mounting operation through abutting support of the bottom of the cup 94 against a socket tool. Consequently, a socket tool 100 is provided which is bored as at 102 to freely accommodate the cup 94, and adjacent its upper end the socket is formed with a conical wall portion 104 which is adapted to accurately fit the lower outer surface of the ring 96 which shoulders under the sheet 90 at the edge of the inserting aperture therethrough in the manner of the shoulder portion 54 of the device of Figs. 4 and 5. The ring 96 is also formed with a horizontal step portion 106 at its lowermost end portion, and the socket member is provided with a complementary step portion so as to be adapted to firmly support the ring 96 against the downwardly directed forces imposed upon it during operation of the plunger 80 in connection with the flange deforming process. As in the case of the device of Figs. 4 and 5, the central boss portion of the plunger 80 fits within the space between the flange portion of the connector element during the flange deforming process so that upon completion of the stroke of the plunger the ring 96 is firmly locked upon the supporting plate 90 and is free of any unintended deformation such as would otherwise interfere with smooth operation of the locking shaft 50.

It will be understood that the plunger and socket devices described hereinabove are adapted to be brought into operation in any desired manner, such as in conjunction with a power operated tool illustrated by Fig. 1 wherein a Camloc collar element 10 is shown mounted within a socket 30 in association with a sheet metal piece 12 preparatory to pressing the deformable flange of the collar member into locking engagement upon the piece 12. The socket 30 is mounted upon the upper end of a bolt 110 which is threaded through an apertured portion of a yoke 112 for detachable mounting thereon. The lower end of the bolt 110 is headed as at 114 to provide convenient means for manual rotation of the bolt in order to obtain vertical adjustments of the bolt in the yoke member to accommodate changes in plunger-socket sets in connection with the handling of sheet metal pieces of varying thicknesses and connector devices of varying dimensions. A lock nut 116 is provided for locking the bolt 110 in adjusted positions.

The yoke 112 mounts at its end portion opposite to the mounting of the socket 30 a power device which in the form illustrated comprises a pneumatic cylinder 120 which is operatively associated with a ram 122 to which is attached the plunger 44 of Figs. 2 and 3. It will be understood that the power device 120 may be of any suitable form such as is now available on the market and may be controlled by any suitable means, as will be understood by those acquainted with the machine tool art; and that in lieu of a pneumatic cylinder power device, an electrically operated mechanism or any other suitable form of pressure supplying device may be employed within the conception of the invention. It will also be understood that the socket and plunger devices 70 and 80 and 10 of Figs. 4, 5 and 6 may be similarly mounted upon any suitable power supplying device in connection with the mounting of the Camloc stud elements 14 and 92 of Figs. 4 to 8 upon the corresponding sheet metal pieces 16, but that the method of the invention is not confined to the use of any power supplying tool such as illustrated in Fig. 1 and relates more specifically to the form of the socket and plunger devices illustrated and described hereinabove and to the method of their operation in fixing the connector devices to the supporting sheet members. It will be also understood that although only a limited number of the forms of the invention have been shown and described in detail, it will be apparent to those skilled in the art that the invention is not so limited but that various changes may be made therein without departing from the spirit of the invention or the scope of the appended claims.

I claim:

1. The method of mounting upon a sheet metal member a tubular member having an annular outwardly extending shoulder about the side wall portion of the tubular member intermediate of its ends, the opposite surfaces of said shoulder being one flat and the other frusto-conical, including the steps of inserting an end portion of said tubular member through an aperture in said sheet member with the flat surface of said shoulder in abutting relation thereagainst, providing a backing up surface complementary to said frusto-conical surface but initially spaced slightly therefrom, and inserting in said tubular member a tool having a portion for pressing said shoulder into engagement with said complementary surface with said opposite end of the tubular member backed up whereby the portion of the tubular member inserted in said sheet is expanded in the sheet aperture while the extending end wall portion of the tubular member is pressed outwardly to overlie the edge of the sheet member about the aperture.

2. The method of mounting upon a sheet metal member a tubular member having an annular shoulder extending thereabout intermediate of its ends, including the steps of extending an end portion of the tubular member through an aperture in said sheet member to abut one side of said shoulder against said sheet member, providing a backing up surface for the other side of said shoulder complementary thereto but initially spaced slightly therefrom, and inserting in said tubular member a tool having a portion for pressing said shoulder into engagement with said complementary surface with said opposite end of the tubular member backed up whereby the portion of the tubular member inserted in the sheet is expanded in the sheet aperture while the extending wall portion of the tubular member is pressed outwardly to overlie the edge of the sheet member about the aperture.

WILLIAM C. DITTMAR.

CERTIFICATE OF CORRECTION.

Patent No. 2,337,742. December 28, 1943.

WILLIAM C. DITTMAR.

It is hereby certified that error appears in the printed specification of the above numbered patent requiring correction as follows: Page 3, first column, line 60, strike out the words "flange from being deformed inwardly in such"; and that the said Letters Patent should be read with this correction therein that the same may conform to the record of the case in the Patent Office.

Signed and sealed this 8th day of February, A. D. 1944.

(Seal)

Henry Van Arsdale,
Acting Commissioner of Patents.